US012798341B2

(12) United States Patent
Wang et al.

(10) Patent No.: US 12,798,341 B2
(45) Date of Patent: Nov. 17, 2026

(54) LIFTGATE METALLIC REINFORCEMENT THERMAL JOINING TO THE THERMOPLASTIC INNER PANEL

(71) Applicant: Magna Exteriors Inc., Aurora (CA)

(72) Inventors: Yao Wang, Troy, MI (US); Riad Chaaya, Clarkston, MI (US); Laurent Gillard, Beverly Hills, MI (US); Ondrej Vohlidal, Liberec (CZ)

(73) Assignee: Magna Exteriors Inc., Aurora (CA)

(*) Notice: Subject to any disclaimer, the term of this patent is extended or adjusted under 35 U.S.C. 154(b) by 372 days.

(21) Appl. No.: 18/535,166

(22) Filed: Dec. 11, 2023

(65) Prior Publication Data

US 2024/0227947 A1 Jul. 11, 2024

Related U.S. Application Data

(60) Provisional application No. 63/599,037, filed on Nov. 15, 2023, provisional application No. 63/438,130, filed on Jan. 10, 2023.

(51) Int. Cl.

| | |
|---|---|
| ***B29C 65/02*** | (2006.01) |
| ***B60J 5/10*** | (2006.01) |
| ***B62D 27/02*** | (2006.01) |
| ***B62D 29/00*** | (2006.01) |

(52) U.S. Cl.

CPC ............... *B60J 5/107* (2013.01); *B29C 65/02* (2013.01); *B62D 27/02* (2013.01); *B62D 29/001* (2013.01)

(58) Field of Classification Search

CPC ........ B60J 5/107; B62D 27/02; B62D 29/001; B29C 65/02; B29C 65/645; B29C 65/44

USPC ........................................................ 156/73.1

See application file for complete search history.

(56) References Cited

U.S. PATENT DOCUMENTS

2024/0025487 A1* 1/2024 Smith .................... B62D 33/03

FOREIGN PATENT DOCUMENTS

| | | | |
|---|---|---|---|
| CA | 3175829 | A1 | 10/2021 |
| DE | 102008063654 | A1 | 7/2010 |
| DE | 102013001943 | A1 | 3/2014 |
| JP | 2018065322 | A | 4/2018 |
| KR | 101994942 | B1 | 7/2019 |

OTHER PUBLICATIONS

European Search Report for Application No. 233217356.7 Mailed Jun. 11, 2024.

European office Action for Application No. 23217356.7—Mailed Oct. 9, 2025.

* cited by examiner

*Primary Examiner* — James D Sells

(57) ABSTRACT

A reinforced lift gate panel arrangement that includes a lift gate panel formed of fiber filled polymer material. The lift gate panel has a structural side with a connection surface region. The arrangement further includes at least one reinforcement bracket with a panel contact side and a tool contact side with at least one aperture formed through the reinforcement bracket that extends from the panel contact side to the tool contact side. There is at least one mechanical lock formed between the lift gate panel and the reinforcement bracket. The mechanical lock is formed by a portion of the fiber filled polymer material curing in the at least one aperture of the reinforcement bracket.

13 Claims, 4 Drawing Sheets

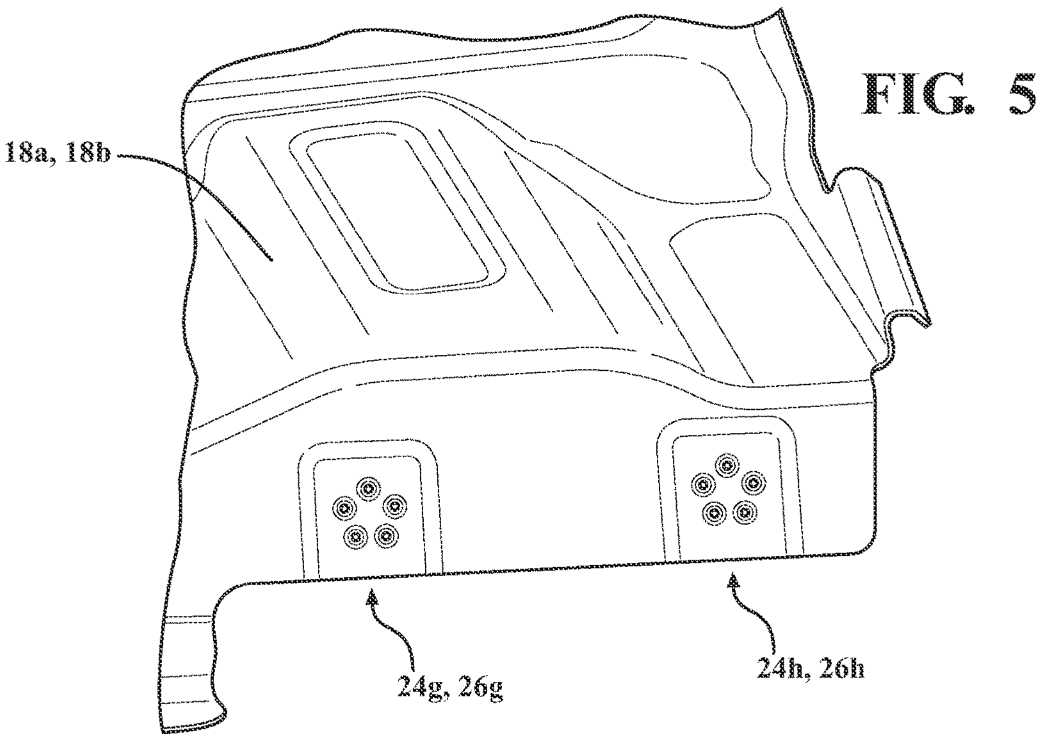
FIG. 5
FIG. 6
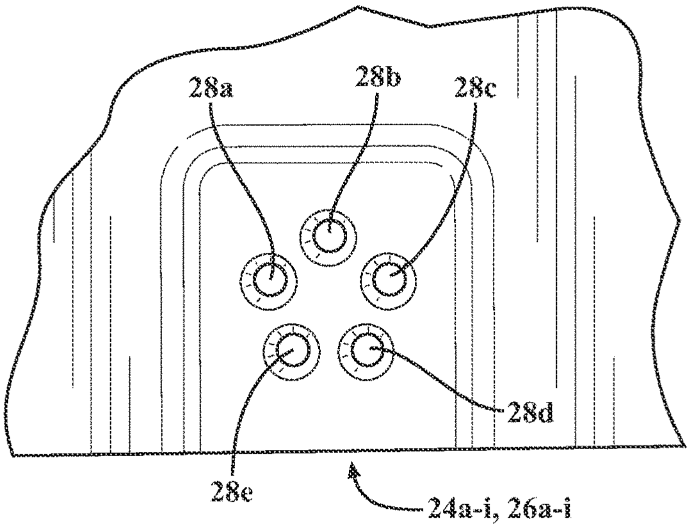
FIG. 7
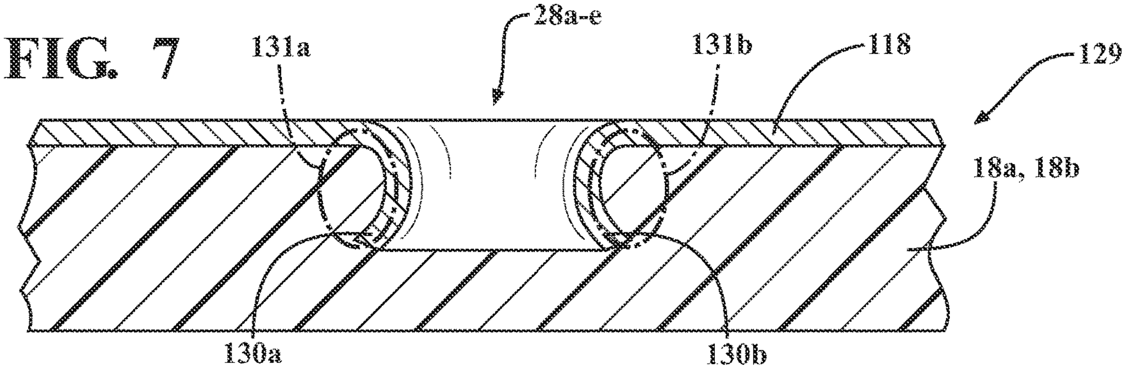

LIFTGATE METALLIC REINFORCEMENT THERMAL JOINING TO THE THERMOPLASTIC INNER PANEL

FIELD OF THE INVENTION

The present invention relates to a method of joining metal reinforcements to thermoplastic liftgate inner panels using various thermal joining techniques.

BACKGROUND OF THE INVENTION

In the automotive field it has been desirable to produce exterior components out of polymeric material, rather than by forming the components out of metal. In particular lift gates for a vehicle have traditionally been formed of stamped metal components. More recently there have been several different lift gates produced that are formed of thermoplastic material. This provides a substantial reduction in weight, as well as providing greater variety in style and design, sense the thermoplastic material is able to be more easily formed with greater angles, forming the lift gate or other components out of thermoplastics can sometimes require the attachment of reinforcements. Typically, reinforcements used in thermoplastic lift gates are metal plates which are fastened to the interior portion of the lift gate, connecting the metal reinforcements at specific locations is accomplished using fasteners or adhesives. However, this is problematic because the use of fasteners increases production time and complexity, while using adhesives increases costs and creates recycling difficulties, since the adhesive material is adhered to the metal reinforcement. It is desirable to develop new methods for connecting the reinforcements at desired locations on the thermoplastic lift gate.

SUMMARY OF THE INVENTION

A reinforced lift gate panel arrangement that includes a lift gate panel formed of fiber filled polymer material. The lift gate panel has a structural side with a connection surface region. The arrangement further includes at least one reinforcement bracket with a panel contact side and a tool contact side with at least one aperture formed through the reinforcement bracket that extends from the panel contact side to the tool contact side. There is at least one mechanical lock formed between the lift gate panel and the reinforcement bracket. The mechanical lock is formed by a portion of the fiber filled polymer material curing in the at least one aperture of the reinforcement bracket.

In the present embodiment of the invention the at least one reinforcement bracket is connected to the lift gate panel using only the at least one mechanical lock and without adhesives. Also, in the present embodiment of the invention the at least one reinforcement bracket is connected to the lift gate panel using only the at least one mechanical lock and without threaded fasteners.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 an enlarged side perspective of a portion of the reinforcement bracket.

FIG. 6 is an enlarged elevational view of one group of apertures formed in the reinforcement bracket.

FIG. 7 is an enlarged cross sectional side elevational view of an alternative mechanical connection between a reinforcement bracket and a liftgate panel according to another embodiment of the invention.

DETAILED DESCRIPTION OF THE PREFERRED EMBODIMENTS

The following description of the preferred embodiments is merely exemplary in nature and is in no way intended to limit the invention, its application, or uses.

Referring now to the FIGS. 1 and 2-6 there is shown a reinforced lift gate panel arrangement 10 that includes a lift gate panel 12 formed of fiber filled polymer material. The lift gate panel 12 has a structural side 14 two connection surface regions 16*a*, 16*b*. While two connection surface regions 16*a*, 16*b* are shown it is within the scope of this invention for there to be a lesser or greater number of connection surface regions depending on the needs of a particular application. The reinforced liftgate panel arrangement 10 further includes reinforcement bracket 18*a*, 18*b* each having a panel contact side 20*a*, 20*b* and a tool contact side 22*a*, 22*b*. Each reinforcement bracket 18*a*, 18*b* includes a number of connection regions 24*a-i*, 26*a-i* that each include apertures 28*a-e* formed through the respective reinforcement bracket 18*a*, 18*b* and extends from the panel contact side 20*a*, 20*b* to the tool contact side 22*a*, 22*b*. The connection surface regions 16*a*, 16*b* are shaped surfaces or regions on the structural side 14 of the lift gate panel 12 that allow all or a portion of the corresponding the reinforcement brackets 18*a*, 18*b* to have surface to surface contact with the structural side 14, so that a suitable mechanical connection can be formed. It is also within the scope of the invention for just each of the connection regions 24*a-i*, 26*a-i* to have surface to surface contact with the connection surface region 16*a*, 16*b* of the reinforcement bracket 18*a*, 18*b*. The present embodiment of the invention shows two once piece reinforcement brackets 18*a*, 18*b* it is within the scope of the invention for there to be a greater or lesser number of reinforcement brackets, or for them to be formed of multiple pieces.

Figure 1:
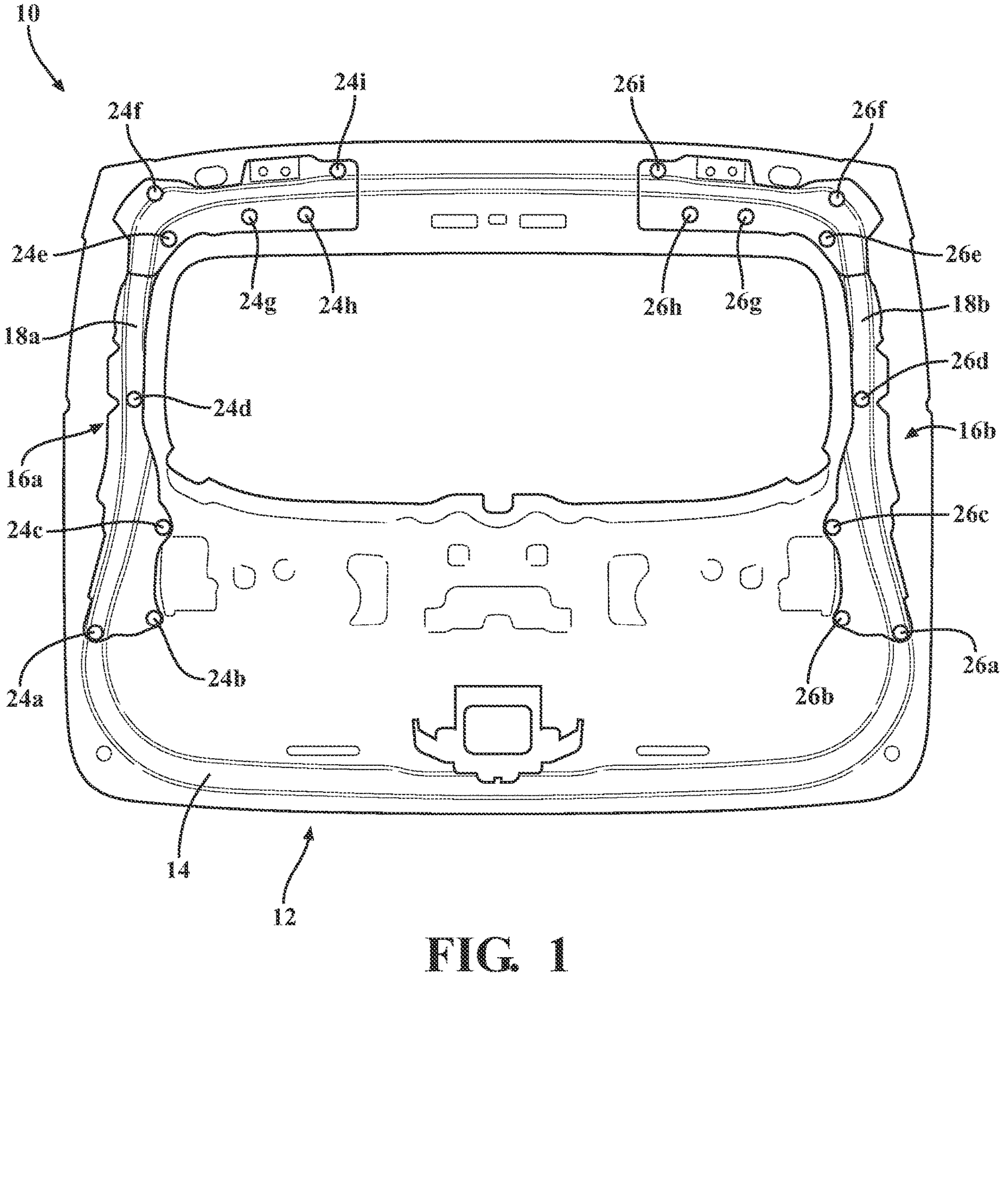
FIG. 1 is a rear side elevational view of a liftgate arrangement according to one embodiment of the present invention.
Figure 2:
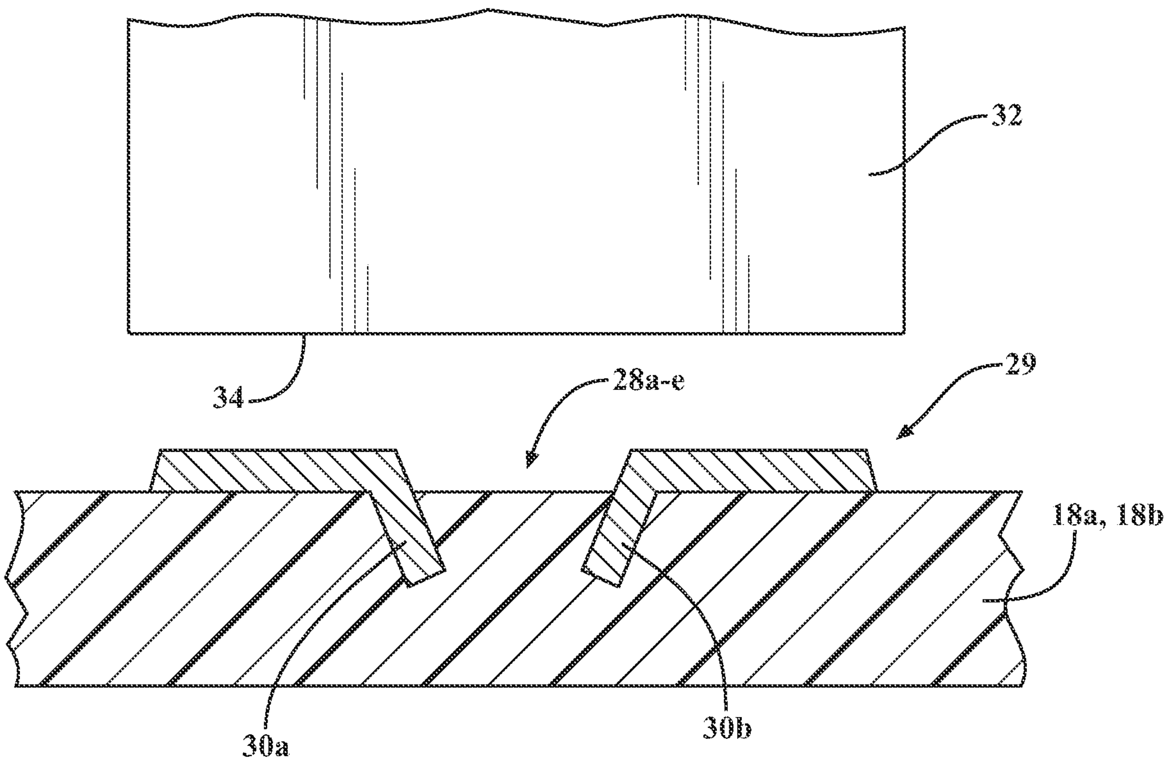
FIG. 2 is a side elevational schematic view of a method of forming a mechanical connection between a reinforcement bracket to a liftgate panel.
Figure 3:
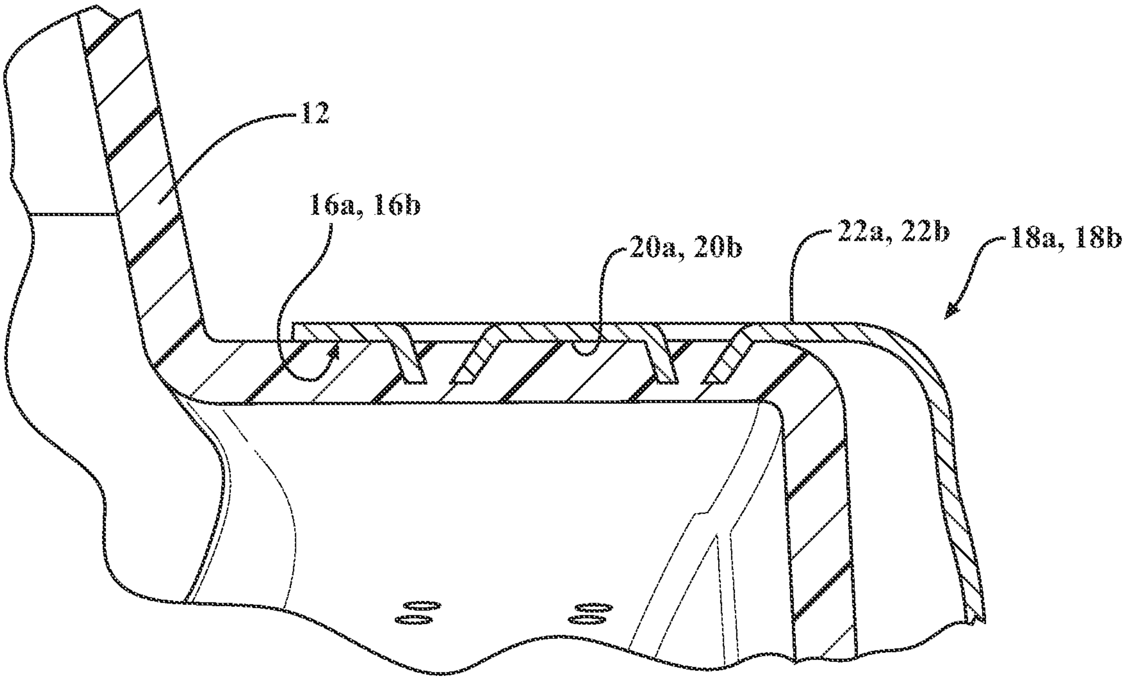
FIG. 3 is an enlarged cross sectional side elevational view of a reinforcement bracket connected to a lift gate panel.
Figure 4:
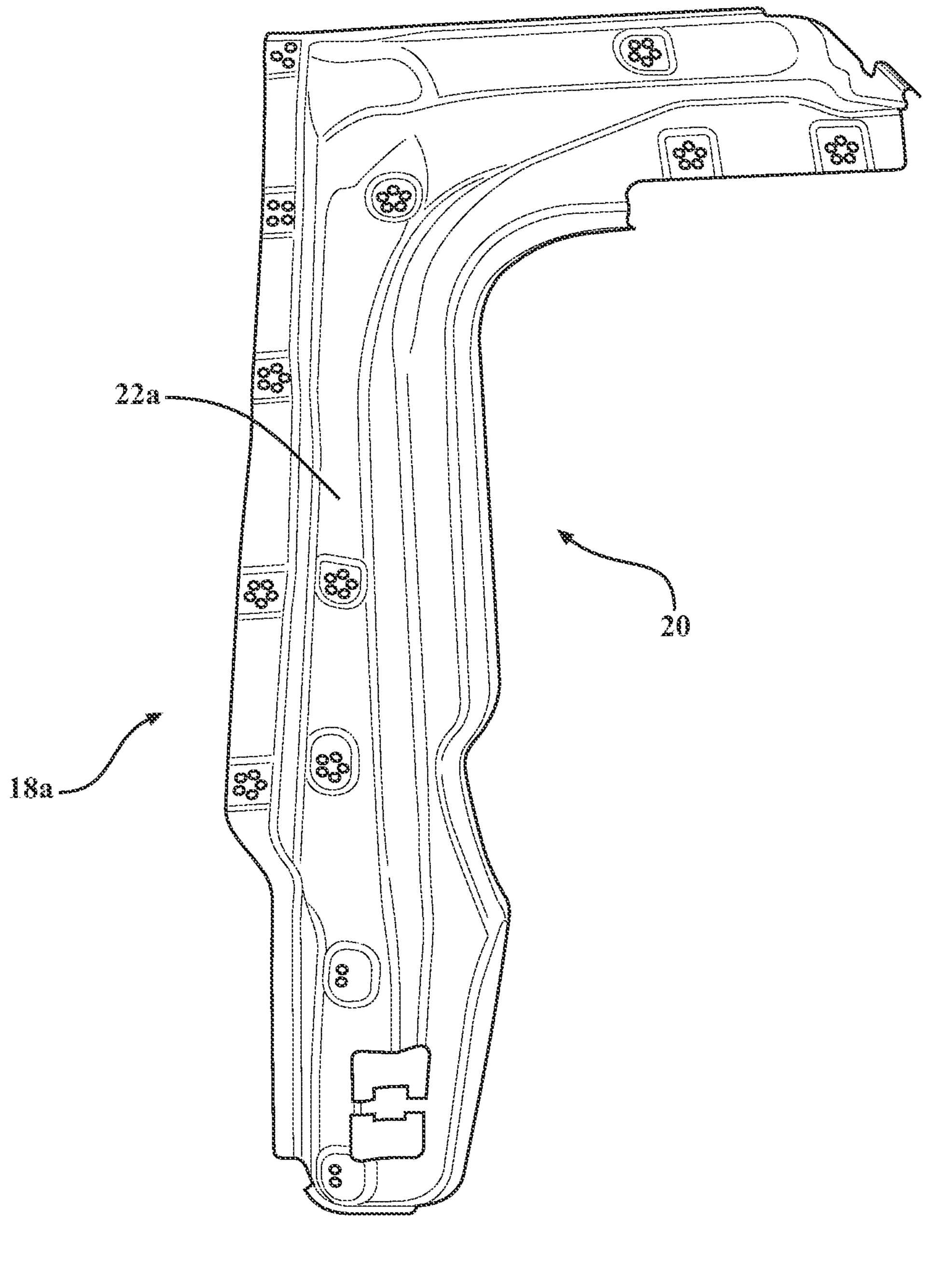
FIG. 4 is a side elevational view of a reinforcement bracket according to one embodiment of the present invention.

As described above each of the connection regions 24*a-i*, 26*a-i* include apertures 28*a-e* totaling five in number. While five apertures are shown it is within the scope of the invention for a greater or lesser number of apertures to be used. At each aperture, a mechanical lock is between the reinforcement bracket 18*a*, 18*b* and the liftgate panel 12 is formed using the method described below. FIG. 2 is a cross sectional view of a mechanical lock 29, which would be formed at each of the apertures 28*a-e* of the connection regions 24*a-i*, 26*a-i* described above. As shown the apertures 28*a-e* each have a draft angle 30*a*, 30*b* that is an angled edge of the material of the reinforcement bracket 18*a*, 18*b*.

The fiber filled polymeric material of the lift gate panel 12 is melted in a localized region so that the draft angle 30*a*,30*b* becomes embedded into the material of the lift gate panel 12 to form the mechanical lock 29 that is strengthened by the draft angle 30*a*, 30*b* providing more surface area and better embedding into the lift gate panel 12.

In the present embodiment of the invention the reinforcement brackets 18*a*, 18*b* are connected to the lift gate panel 12 using only the mechanical locks and without adhesives. Also, in the present embodiment of the invention the reinforcement bracket 18*a*, 18*b* are connected to the lift gate panel 12 using only the mechanical locks, without threaded fasteners.

Another embodiment of the present invention is directed to a method of connecting the reinforcement brackets 18*a*, 18*b* to the lift gate panel 12 for a vehicle. The method includes the steps of providing the reinforcement bracket 18*a*, 18*b* having a panel contact side 20*a*, 20*b* and a tool contact side 22*a*, 22*b*. The reinforcement bracket 18*a*, 18*b* is formed of metal or alloy. Suitable material includes iron, steel and aluminum. The reinforcement bracket 18*a*, 18*b* includes at least one aperture 28*a-e* formed through the reinforcement bracket 18*a*, 18*b* that extends from the panel contact side 20*a*, 20*b* to the tool contact side 22*a*, 22*b*. The method further includes providing the lift gate panel 12 having a structural side 14 with the connection surface region 16*a*, 16*b*. The lift gate panel 12 is formed of long fiber filled polymeric material. The lift gate panel 12 can be an inner panel, middle panel or outer panel of a lift gate. Suitable polymers for forming the liftgate inner panel include ABS, polypropylene and thermoplastic olefin materials, while suitable long fibers includes glass fibers, carbon fibers, or any other type of filler material.

The method further includes providing a lock forming tool 32 with an output surface 34. The lock forming tool 32 can take many forms depending on the requirements of a particular application. However, it is within the scope of this invention for the lock forming tool 32 to include, but not be limited to one of an ultrasonic welding tool, a microwave welding tool, an induction heating tool, a heat staking tool, and combinations thereof where several tools are used in unison or succession.

The method continues with a first step of placing the reinforcement bracket 18*a*, 18*b* against the structural side 14 of the lift gate panel 12, so that the panel contact side 20*a*, 20*b* is in contact with the connection surface region 16*a*, 16*b* of the lift gate panel 12. Then a step of positioning the lock forming tool 32 so that the output surface is in contact with the tool contact side of the reinforcement bracket is conducted. During this step, the output surface 34 surrounds the apertures 28*a-e* of the reinforcement bracket 18*a*, 18*b*.

Once the lock forming tool 32 is in position, a step of energizing the lock forming tool 32 occurs. During this step heating of a portion of the reinforcement bracket 18*a*, 18*b* and a portion of the lift gate panel 12 occurs. A localized molten unit of molten polymer of the lift gate panel 12 is formed and a part of the molten unit flows into the at least one aperture 28*a-e* of the reinforcement bracket. Then a step during a step the lock forming tool 32 is deenergized and removed from the reinforcement bracket 18*a*, 18*b*. At a step, the molten unit is cured to form a mechanical lock 29 that connects the reinforcement bracket to the lift gate inner panel.

FIG. 7 is an enlarged cross sectional side elevational view of an alternative mechanical connection between a reinforcement bracket and a liftgate panel according to another embodiment of the invention. As shown in FIG. 7 there is a cross sectional view of a mechanical lock 129, which would be formed at each of the apertures 28*a-e* of the connection regions 24*a-i*, 26*a-i* described above. The apertures 28*a-e* each have a concave draft angle 130*a*, 130*b* where a portion of the metal around the apertures 28*a-e* is curved back or bend backward to form a collar in the material of a reinforcement bracket 118, which can be used in place of reinforcement bracket 18*a*, 18*b* discussed above. The fiber filled polymeric material of the lift gate panel 12 is melted into a fixing region 131*a*, 131*b* and the concave draft angle 130*a*, 130*b* becomes embedded into the material of the lift gate panel 12 to form the mechanical lock 129, that is strengthened by the concave draft angle 130*a*, 130*b* providing more surface area and better embedding into the lift gate panel.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of connecting a reinforcement bracket to a lift gate panel for a vehicle comprising the steps of:
- providing a reinforcement bracket with a panel contact side and a tool contact side, the reinforcement bracket includes at least one aperture formed through the reinforcement bracket that extends from the panel contact side to the tool contact side;
- providing a lift gate panel having a structural side with a connection surface region;
- providing a lock forming tool with an output surface;
- placing the reinforcement bracket against the structural side of the lift gate panel so that the panel contact side is in contact with the connection surface region of the lift gate panel;
- positioning the lock forming tool so that the output surface is in contact with the tool contact side of the reinforcement bracket, wherein the output surface surrounds the at least one aperture of the reinforcement bracket;
- energizing the lock forming tool and heating a portion of the lift gate panel to form a localized molten unit, wherein a part of the molten unit flows into the at least one aperture of the reinforcement bracket;
- deenergizing the lock forming tool and removing the lock forming tool from the reinforcement bracket;
- curing the molten unit to form a mechanical lock that connects the reinforcement bracket to the lift gate inner panel.

2. The method of claim 1, wherein the reinforcement bracket further comprises an edge of material adjacent to each of the at least one aperture and having a draft angle surface that extends into the molten unit and forms part of the mechanical lock.

3. The method of claim 1, wherein the lock forming tool is an ultrasonic welding tool, a microwave welding tool, an induction heating tool or a heat staking tool.

4. The method of claim 1, wherein the at least one aperture includes a concave draft angle surface where a portion of the metal around the at least one aperture forms a collar in the material of the reinforcement bracket, and the connection surface region includes a fixing region, and the concave draft angle surface becomes embedded into the material of the lift gate panel in the fixing region to form the mechanical lock.

5. A method of connecting a reinforcement bracket to a lift gate panel for a vehicle, the method comprising the steps of:

placing a metal bracket against a lift gate panel at least partially formed from a thermoplastic material, wherein the bracket has an edge of material that surrounds at least part of an aperture through the bracket, and wherein the edge of material extends from a panel contact side of the bracket that is received against the lift gate panel;

positioning a tool against the bracket;

energizing the tool and heating the bracket to melt or at least soften an area of the lift gate panel, wherein a force of the tool on the bracket causes at least part of the edge of material of the bracket to be pressed into the area of the lift gate panel; and deenergizing the tool and removing the tool from the bracket, wherein, upon cooling of the area of the lift gate panel the area of the liftgate panel will overlap the at least part of the edge of material of the bracket.

6. The method of claim 5 wherein the step of placing the bracket against the lift gate panel includes positioning the panel contact side of the bracket on the lift gate panel with the edge of material in contact with the lift gate panel.

7. The method of claim 5 wherein the tool has an output surface that is positioned over the aperture and which provides a force on the bracket pressing the bracket in the direction of the lift gate panel.

8. The method of claim 7, wherein the bracket includes multiple apertures within a connection region of the bracket, each of the multiple apertures surrounded at least in part by a respective edge of material, and wherein the output surface is received over each of the multiple apertures within the connection region and the area of the lift gate panel includes an area overlapped by each of the multiple apertures.

9. The method of claim 5 wherein the tool is an ultrasonic welding tool, a microwave welding tool, an induction heating tool, or a heat staking tool.

10. The method of claim 5 wherein the edge of material has a draft angle such that the aperture is smaller at the panel contact side of the bracket than a tool contact side of the bracket.

11. The method of claim 5 wherein the edge of material is curved back or bent backward and defines a concave draft angle in the edge of material.

12. The method of claim 11 wherein the concave draft angle is defined in an outer surface of the edge of material, and the aperture is defined by an inner surface of the edge of material that has a convex shape.

13. The method of claim 5 wherein the aperture is a first aperture and the first aperture is located in a first connection region of the bracket, and wherein the bracket includes multiple other connection regions, each other connection region has at least one other aperture that is not the first aperture and each of the other apertures has an edge of material, and wherein the step of heating the bracket includes heating each of the connection regions.

* * * * *